(12) United States Patent
Kato (10) Patent No.: US 10,641,987 B2
(45) Date of Patent: May 5, 2020

(54) CONTROL APPARATUS, LENS APPARATUS, AND OPERATING APPARATUS

(71) Applicant: CANON KABUSHIKI KAISHA, Tokyo (JP)

(72) Inventor: Takashi Kato, Utsunomiya (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 174 days.

(21) Appl. No.: 15/800,763

(22) Filed: Nov. 1, 2017

(65) Prior Publication Data

US 2018/0143397 A1    May 24, 2018

(30) Foreign Application Priority Data

Nov. 24, 2016  (JP) ................. 2016-227542

(51) Int. Cl.
G02B 7/02       (2006.01)
G02B 7/10       (2006.01)
H04N 5/232      (2006.01)
G03B 3/10       (2006.01)
G03B 13/36      (2006.01)
G05B 15/02      (2006.01)

(52) U.S. Cl.
CPC .............. G02B 7/102 (2013.01); G03B 3/10 (2013.01); G03B 13/36 (2013.01); G05B 15/02 (2013.01); H04N 5/23212 (2013.01); H04N 5/23245 (2013.01)

(58) Field of Classification Search
CPC ....................................... G02B 7/102
USPC ........................................ 359/824
See application file for complete search history.

(56) References Cited

U.S. PATENT DOCUMENTS

2010/0208122 A1*  8/2010  Yumiki ................. G02B 7/021
                                                  348/333.08

FOREIGN PATENT DOCUMENTS

JP    H04145776 A    5/1992
JP    H05307206 A    11/1993

OTHER PUBLICATIONS

Office Action issued in Japanese Application No. 2016-227542 dated Aug. 28, 2018. English translation provided.
(Continued)

*Primary Examiner* — James C. Jones
(74) *Attorney, Agent, or Firm* — Rossi, Kimms & McDowell LLP (57) ABSTRACT

A controller includes: operating member having movable range for operating a movable optical member; setting device setting relation between operation amount in entirety of movable range and command value in part of an operating range of the movable optical member; controller generating signal for controlling operation of the movable optical member, based on the set relation and an operation amount of the operating member in the movable range; and switcher switching mode between first mode causing the entirety of the movable range to correspond to entirety of the operating range, and second mode causing the entirety of the movable range to correspond to the part of the operating range. The setting device sets the relation such that a point in the operating range corresponding to a reference point, set by the setting device, in the movable range is unchanged in any of the first or second mode is selected.

10 Claims, 10 Drawing Sheets (56) References Cited

OTHER PUBLICATIONS

Office Action issued in Japanese Application No. 2016-227542 dated Aug. 28, 2018.

* cited by examiner

| FOCUS POSITION (RELATIVE VALUE) | REAL DISTANCE |
|---|---|
| 0 | 0.8 m |
| 10 | 0.9 m |
| 20 | 1.0 m |
| ⋮ | ⋮ |
| 350 | 200.0 m |
| 360 | ∞ |

CONTROL APPARATUS, LENS APPARATUS, AND OPERATING APPARATUS

BACKGROUND OF THE INVENTION

Field of the Invention

The present invention relates to a control apparatus, a lens apparatus, and an operating apparatus.

Description of the Related Art

Figure 15:
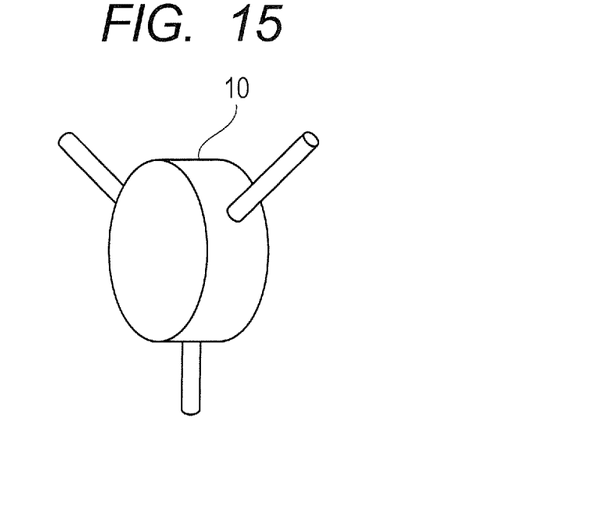
FIG. 15 illustrates a focus controller.
Figure 16:
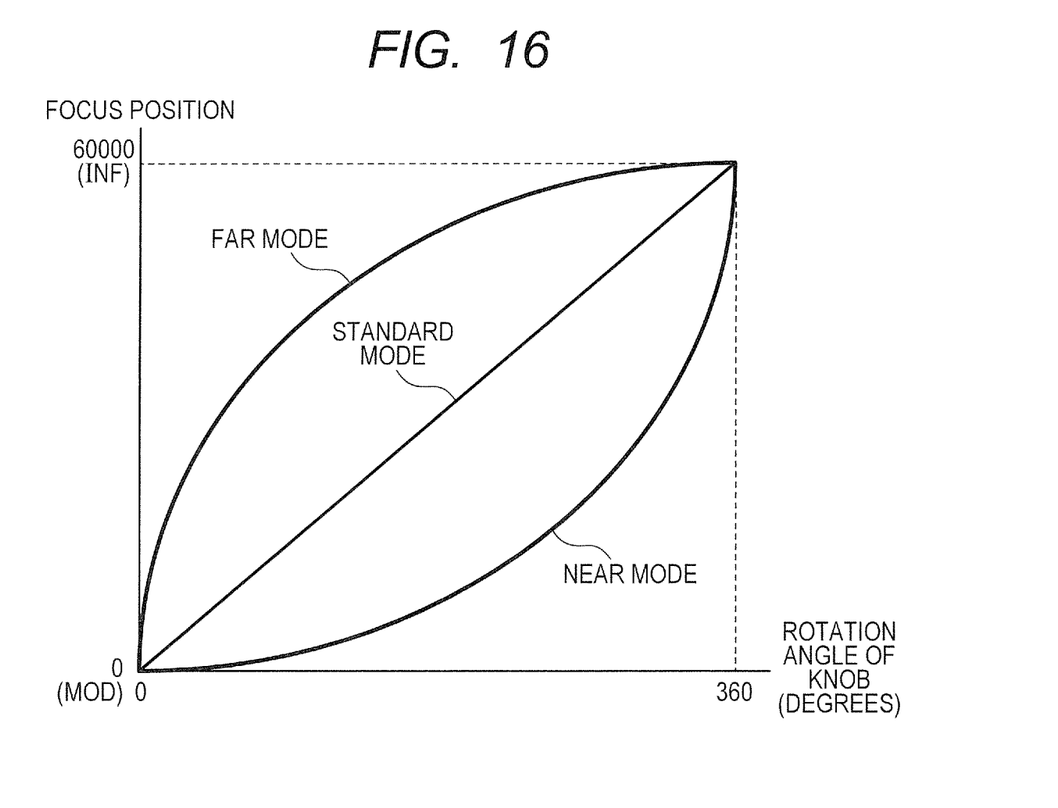
FIG. 16 is a characteristic diagram of a conventional focus controller.

The focus controllers in imaging apparatuses such as television cameras include a servomechanism constituted of a drive system such as a motor and a control system that controls this drive system. To provide a command signal to the control system in this servomechanism, a focus controller 10 as illustrated in FIG. 15 is used. Its operating unit has a rotary mechanism, which is adapted to be stopped from being rotationally operated a predetermined rotation angle or further by a mechanical stopper so that one can sensuously figure out the relation between the operated rotation angle and the focus position. If the amount of operation of the focus controller 10 and the amount of drive of the focus lens are proportional, the sensitivity of focusing relative to the amount of rotation of the focus knob is high under shallow depth-of-field conditions. To avoid this, a technique has been proposed in which how the amount of drive of a focus lens shifts is varied to curve with gentle gradients on a near side or far side with respect to the amount of rotation of the focus knob, as illustrated in FIG. 16 (e.g. Japanese Patent Application Laid-Open No. H04-145776).

However, the conventional technique disclosed in Japanese Patent Application Laid-Open No. H04-145776 cannot always ensure the desired operation characteristic within the desired imaging distance range. Moreover, a certain spot includes a region where the amount of drive of the focus lens is large relative to the rotation angle of the focus knob. This lowers the operability.

SUMMARY OF THE INVENTION

The present invention provides, for example, a control apparatus advantageous in operability of a movable optical member.

The present invention includes: an operating member having a limited movable range and used to operate a movable optical member; a setting device configured to set a relation between an operation amount in entirety of the movable range of the operating member and a command value in a part of an operating range of the movable optical member; a controller configured to generate a signal for controlling an operation of the movable optical member, based on the set relation and an operation amount of the operating member in the movable range; and a switching device configured to switch modes between a first mode and a second mode, the first mode causing the entirety of the movable range of the operating member to correspond to entirety of the operating range of the movable optical member, the second mode causing the entirety of the movable range of the operating member to correspond to the part of the operating range of the movable optical member. The setting device is configured to set the relation such that a point in the operating range corresponding to a reference point, set by the setting device, in the movable range is unchanged in any of the first mode and the second mode is selected.

According to the present invention, a controller improving the operability of a movable optical member, for example, can be provided.

Further features of the present invention will become apparent from the following description of exemplary embodiments with reference to the attached drawings.

DESCRIPTION OF THE EMBODIMENTS

Preferred embodiments of the present invention will now be described in detail in accordance with the accompanying drawings.

Embodiment 1

Figure 1:
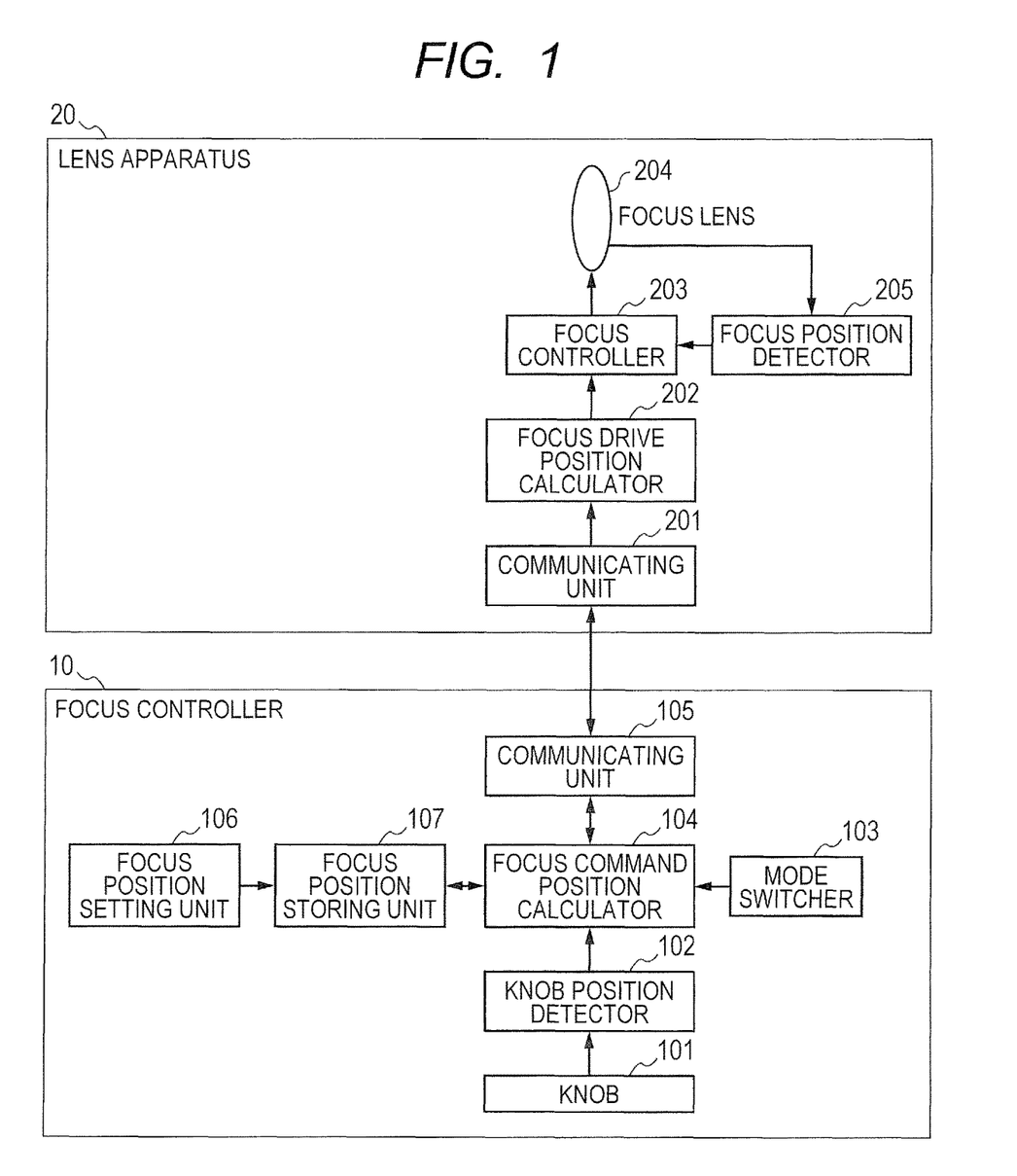
FIG. 1 is a system block diagram of a focus controller.
Figure 2:
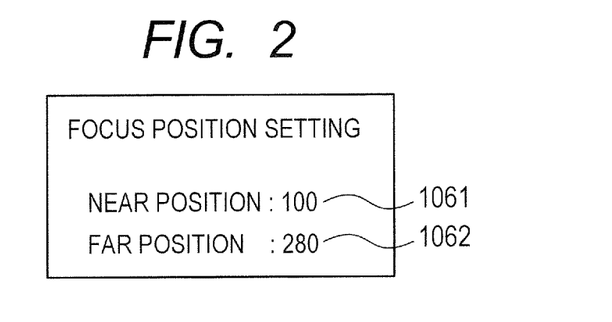
FIG. 2 illustrates a user interface (embodiment 1).

FIG. 1 is a block diagram of the circuit configuration of a focus controller (drive controller) in embodiment 1. Reference numeral 10 denotes a focus controller (operating apparatus) that remotely operates a lens (lens apparatus) 20. Reference numeral 101 denotes a knob with which a camera operator operates the focus. A knob position detector 102 is a position sensor, such as a potentiometer or a rotary encoder, and outputs a position signal proportional to the amount of operation of the knob 101. Reference numeral 103 denotes a mode switching unit (switching device), which can select between a plurality of modes by means of a switch or the like. Reference numeral 104 denotes a focus command position calculator (controller) that calculates a focus command position based on inputs from the knob position detector 102 and the mode switching unit 103. A communicating unit 105 decodes the focus command position calculated by the focus command position calculator 104 into the form of a communication command and sends it to a communicating unit 201 of the lens 20. A focus position setting unit (setting device) 106 is capable of receiving inputs of any focus positions, and includes a user interface as illustrated in, for example, FIG. 2. Two values of a near side set value 1061 and a far side set value 1062 (end-correspondence positions) can be set. While a user interface as illustrated in FIG. 2 is employed in this embodiment, two controls or the like may be provided to set the two values. A focus position storing unit 107 is a non-volatile memory and stores focus position data set at the focus position setting unit 106, which will be read out upon request from the focus command position calculator 104.

The communicating unit 201 is included within the lens 20 and performs communication of commands with the communicating unit 105 of the focus controller 10. Upon receiving a focus command position as a command, the communicating unit 201 decodes the received data and sends it to a focus drive position calculator 202. The focus drive position calculator 202 sends a focus drive position command to a focus controller 203. The focus controller 203 generates a drive signal for controlling the drive of a focus lens (movable optical member) 204. Reference numeral 205 denotes a position sensor that detects the position of the focus lens 204. The position signal thus detected is inputted into the focus controller 203, and the focus controller 203 performs feedback control accordingly.

Figure 3:
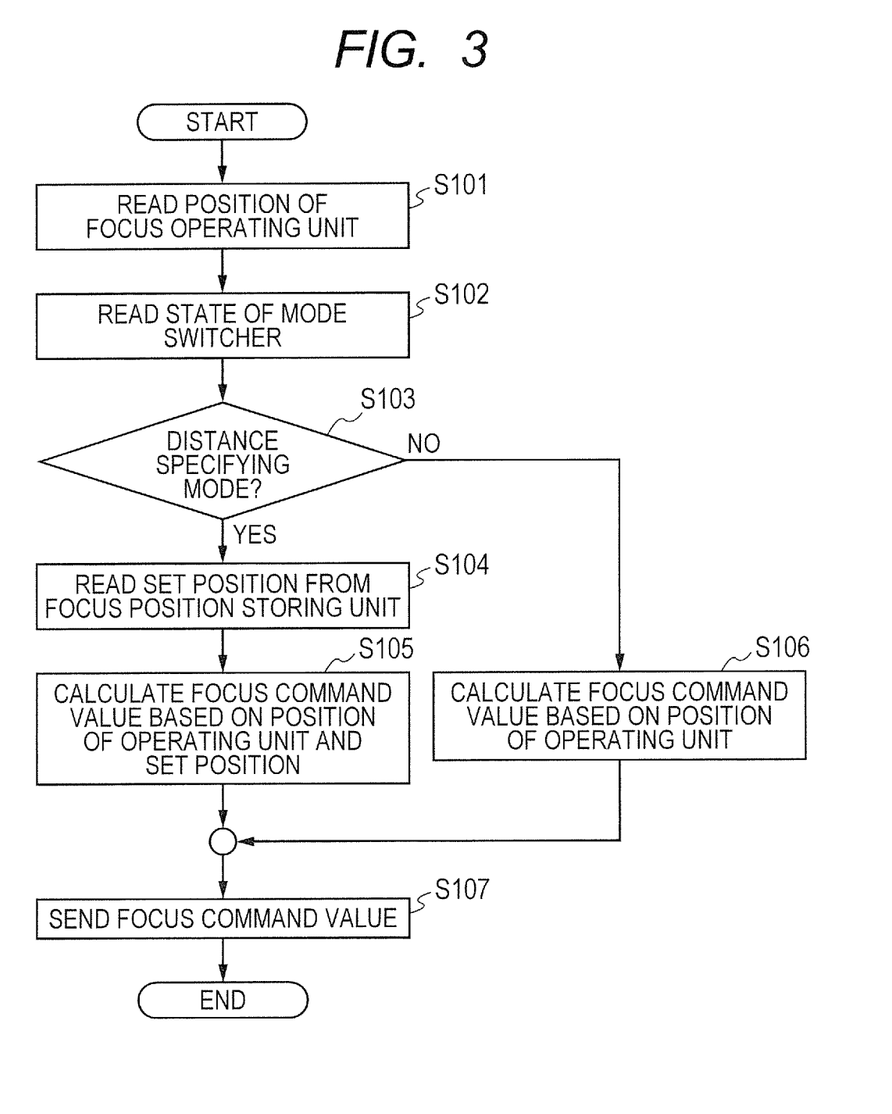
FIG. 3 is a flowchart of a process by a focus command position calculator in embodiment 1.

FIG. 3 is a flowchart of a focus command value calculating process by the focus command position calculator 104 in embodiment 1. In step S101, the focus command position calculator 104 reads the signal from the knob position detector 102. In step S102, the focus command position calculator 104 reads the state of the mode switching unit 103, and proceeds to step S103. The focus command position calculator 104 then proceeds to step S104 if the mode thus read is a distance specifying mode (specifying mode), while the focus command position calculator 104 proceeds to step S106 if the mode is a standard mode. In step S104 with the distance specifying mode, the focus command position calculator 104 reads two set focus positions F_Posi.A and F_Posi.B from the focus position storing unit 107, and in step S105 the focus command position calculator 104 calculates a focus command value by using the values thus read. Specifically, driving operation is allowed with part of the drive range of the focus position associated with the entire movable range of the knob 101.

Figure 4:
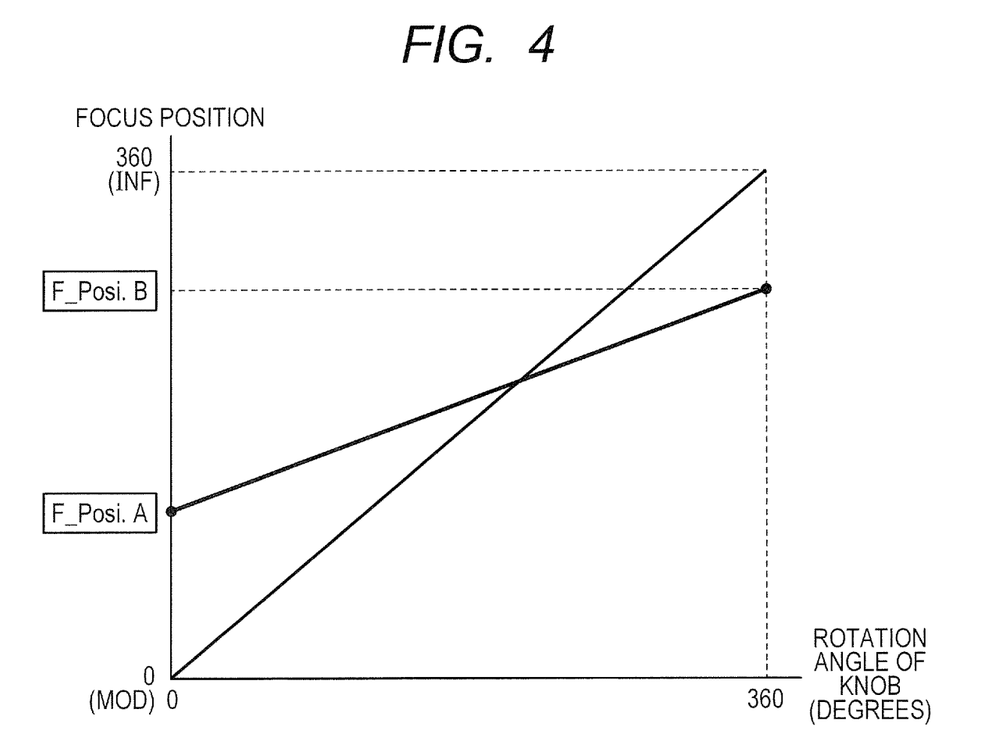
FIG. 4 is a diagram of relations between a knob and a focus command position in embodiment 1.

FIG. 4 is an explanatory diagram of the method of calculating the focus command value in steps S105, S106. A horizontal axis X represents the position read from the knob position detector 102 and is expressed in FIG. 4 as the operated rotation angle (operated position) of the knob 101. In this embodiment, the knob 101 is configured to be rotatable only within a 360° range (a so-called non-endless operating knob, which has a limited movable range) and is adapted to be stopped by a mechanical stopper from being rotated to the outside of the range of 0° to 360°. A vertical axis Y represents the focus command position sent to the lens 20 and is standardized in this embodiment such that the near end is 0 and the far end is 360 for convenience of explanation. In step S105, the focus command position calculator 104 prepares the following equation for calculating the focus command position Y from the operated rotation angle X, based on the two points (0, F_Posi.A) and (360, F_Posi.B) in FIG. 4 (end-correspondence positions, which are the focus positions at the opposite ends of the movable range of the knob).

$$Y = (F\_Posi.B - F\_Posi.A)/360 \times X + F\_Posi.A \quad (1)$$

The focus command position calculator 104 then calculates the focus command position Y corresponding to the operated rotation angle X from the equation (1).

If proceeding to step S106 with the standard mode, the focus command position calculator 104 calculates the focus command position Y from the following equation (2). Specifically, in the standard mode, the rotatable range of the knob 101 is associated based on the correlation from the focus lens' near end (MOD in FIG. 4) to far end (INF in FIG. 4). In this way, the sensitivity to change in the focus position relative to the knob operation angle can be changed, which makes fine adjustment possible.

$$Y = X \quad (2)$$

After calculating the focus command position in step S105 or S106, the focus command position calculator 104 sends the calculated focus command position to the lens 20 through the communicating unit 105 in step S107.

As described above, in the distance specifying mode, operation across the set distance range can be performed using the entire range of the knob 101 of the focus controller 10. This allows easy fine adjustment of the focus. Hence, it is possible to improve the ease of focus operation within the desired imaging distance range.

Embodiment 2

Next, a second embodiment of the present invention will be described. The functional blocks of its focus controller 10 and lens 20 are configured similarly to those in embodiment 1.

Figure 5:
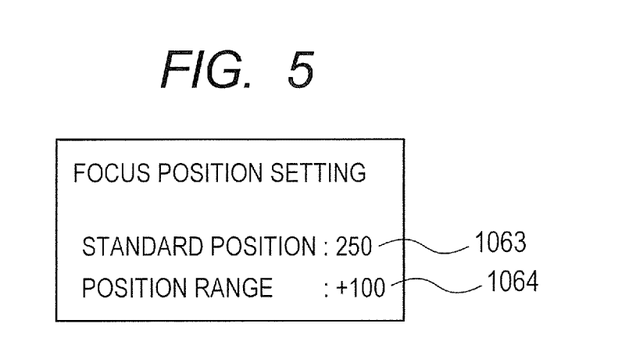
FIG. 5 illustrates a user interface (embodiment 2).

FIG. 5 is an example of the user interface of the focus position setting unit 106 in embodiment 2. In embodiment 2, two values of a standard position set value 1063 and a position range 1064 can be set. While a user interface as illustrated in FIG. 5 is employed in this embodiment, two controls or the like may be provided to set the two values.

Figure 6A:
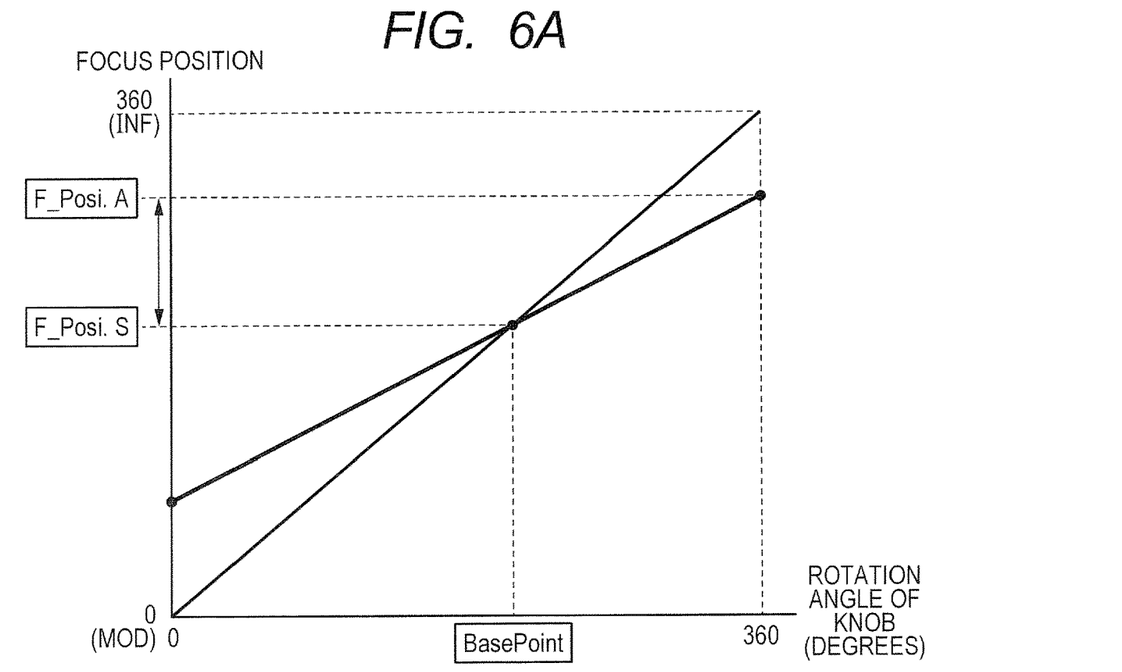
FIG. 6A is a diagram of relations between a knob and a focus command position in embodiment 2.
Figure 6B:
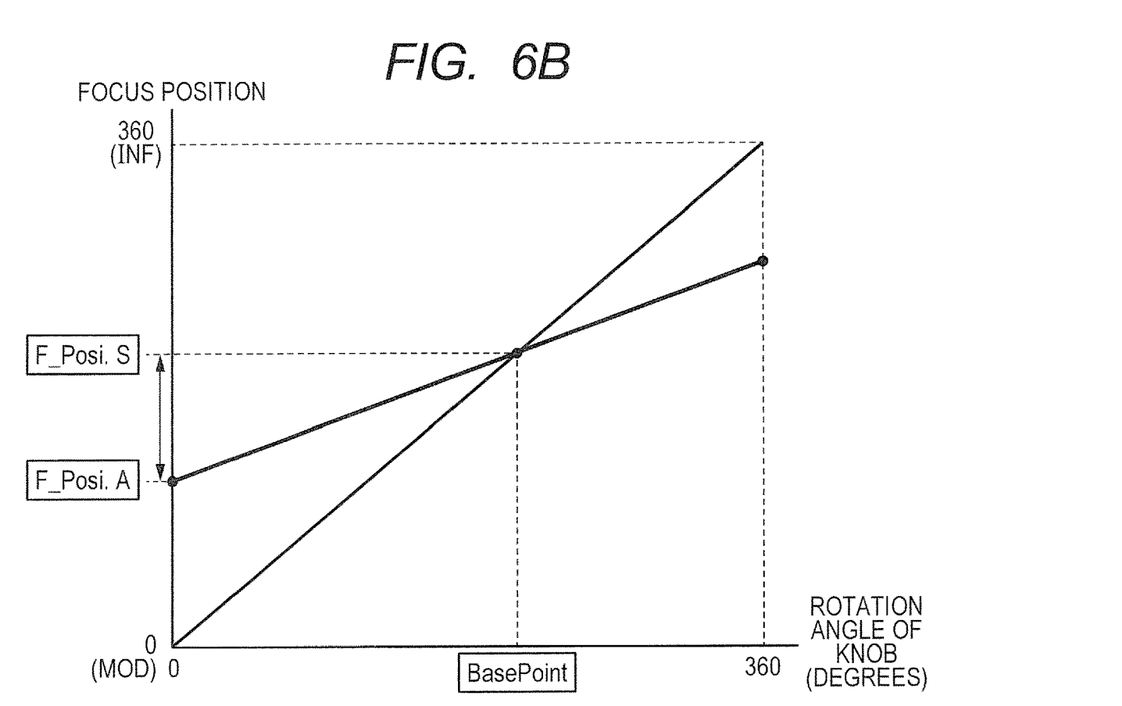
FIG. 6B is a diagram of relations between the knob and the focus command position in embodiment 2.

A flowchart of a focus command value calculating process by the focus command position calculator 104 in embodiment 2 is similar to the flowchart of FIG. 3, which has been described in embodiment 1. The method of calculating the focus command position in step S105 in embodiment 2 will be described. FIGS. 6A and 6B illustrate relations between the position of the operating unit and the focus command position in embodiment 2. The standard position set value 1063 is a point at which the relation between the position of the operating unit and the focus command position remains unchanged regardless of which one of the distance specifying mode and the standard mode is selected. The position range 1064 is a range across which the focus command position is changed (amount of displacement) upon operation of the knob 101 from the standard position set value 1063 to one end position. The position range 1064 is defined as a focus changeable range from the standard position set value to a far side end when the position range 1064 is a positive value, while the position range 1064 is defined as a focus changeable range from the standard position set value to a near side end when the position range 1064 is a negative value.

When the position range 1064 is a positive value, the focus command position calculator 104 prepares the following equation for calculating the focus command position Y from the operated rotation angle X, based on the two points (F_Posi.S, F_Posi.S) and (360, F_Posi.S+F_Posi.A) in FIG. 6A.

$$Y = (F\_Posi.A/(360 - F\_Posi.S)) \times X + F\_Posi.S \times (1 - F\_Posi.A/(360 - F\_Posi.S)) \quad (3)$$

When the position range 1064 is a negative value, the focus command position calculator 104 prepares the following equation for calculating the focus command position Y from the operated rotation angle X, based on the two points (F_Posi.S, F_Posi.S) and (0, F_Posi.S+F_Posi.A) in FIG. 6B.

$$Y=(F\_Posi.A/F\_Posi.S) \times X+(F\_Posi.S-F\_Posi.A) \quad (4)$$

In this way, the sensitivity to change in the focus position relative to the knob operation angle can be changed from the position set as the standard position, which makes fine adjustment possible. In other words, the above is particularly effective in a case of minutely adjusting the focus during image shooting or the like in which limited object distance is set in advance.

As described above, in embodiment 2, operation across a set distance range can be performed using the entire range of the knob 101 of the focus controller 10, as in embodiment 1. This allows easy fine adjustment of the focus. In addition, during the distance specifying mode, any point with the same knob position and focus command position as the standard mode can be set. Hence, it is possible to improve the ease of operation in using and switching between the two modes.

Embodiment 3

Next, a third embodiment of the present invention will be described. The functional blocks of its focus controller 10 and lens 20 are configured similarly to those in embodiment 1.

Figure 7:
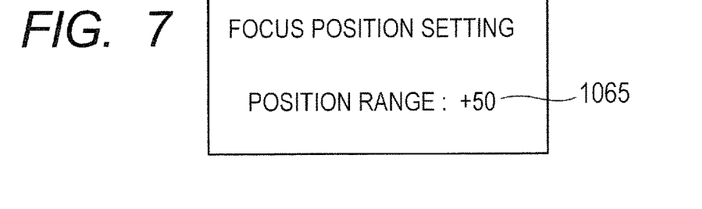
FIG. 7 illustrates a user interface (embodiment 3).

FIG. 7 is an example of the user interface of the focus position setting unit 106 in embodiment 3. A position range 1065 is a range across which the focus command position is allowed to change from the focus position at which the mode is switched to the distance specifying mode. As in embodiment 2, when the position range 1065 is a positive value, the position range 1065 is defined as a range specifying the maximum amount of change in focus toward the far side from the focus position at a point when the mode is switched to the distance specifying mode. When the position range 1065 is a negative value, the position range 1065 is defined as a range specifying the maximum amount of change in focus toward the near side from the focus position at the point when the mode is switched to the distance specifying mode.

Figure 8:
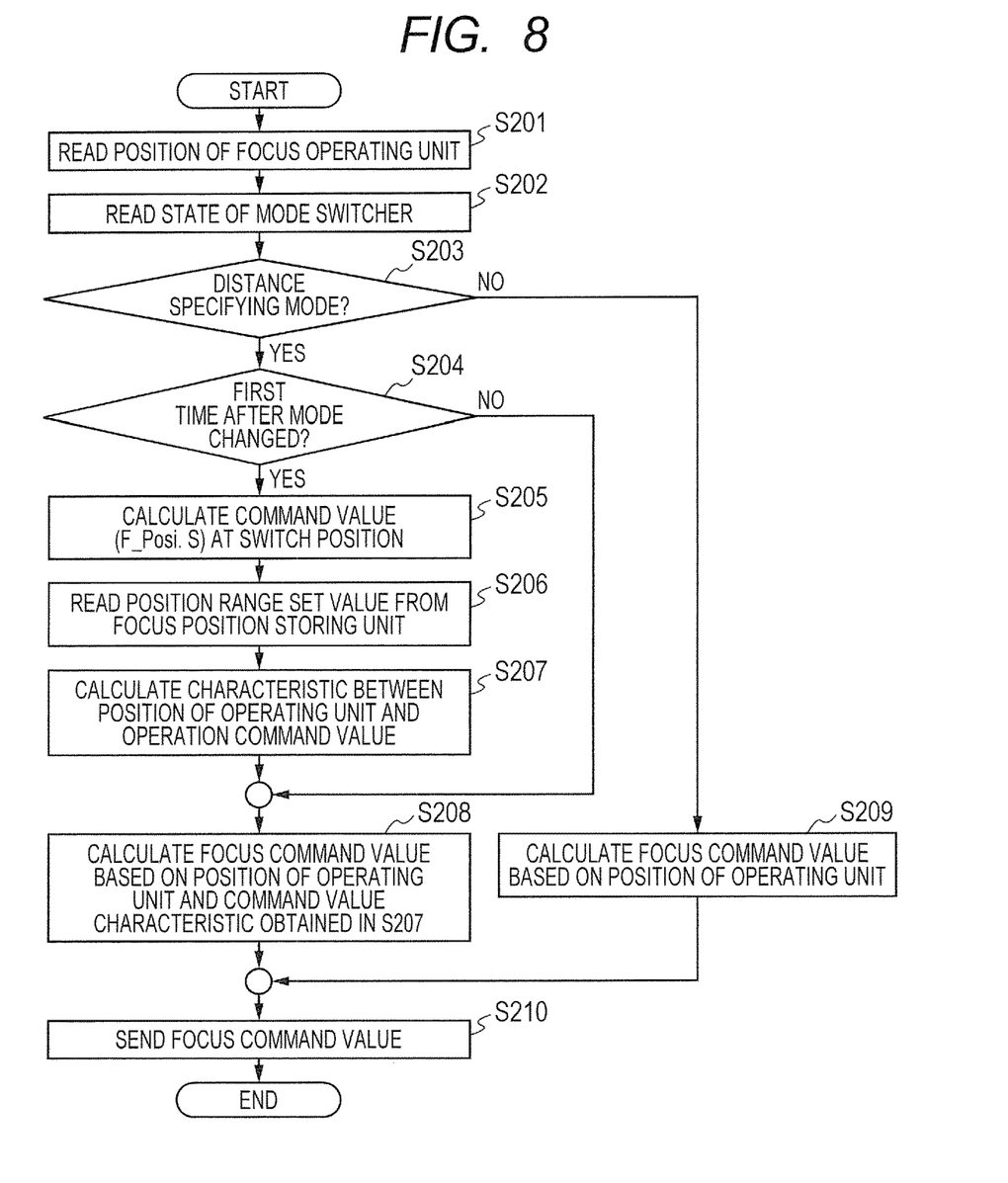
FIG. 8 is a flowchart of a process by a focus command position calculator in embodiment 3.
Figure 9A:
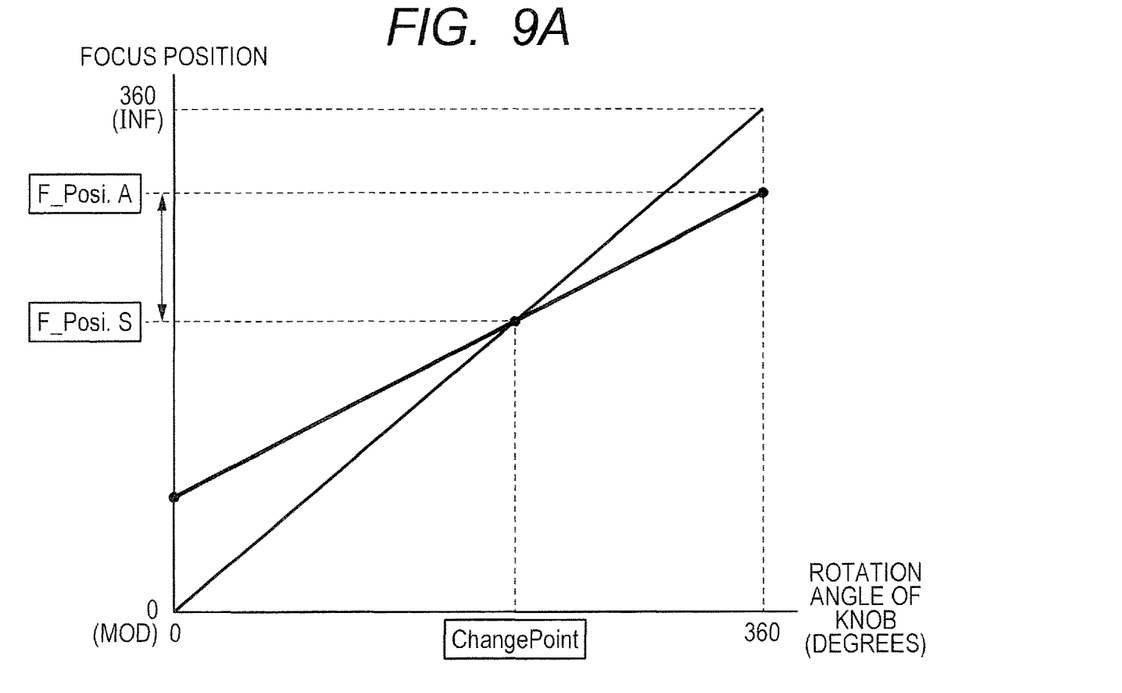
FIG. 9A is a diagram of relations between a knob and a focus command position in embodiment 3.
Figure 9B:
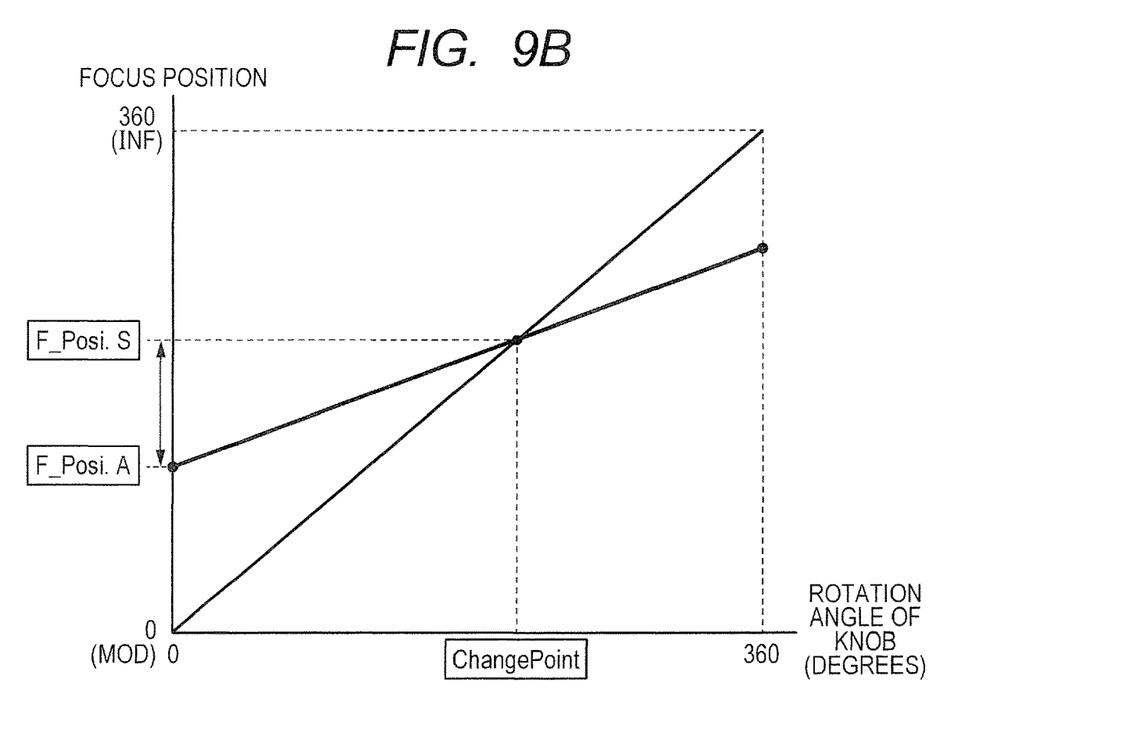
FIG. 9B is a diagram of relations between the knob and the focus command position in embodiment 3.

FIG. 8 is a flowchart of a focus command value calculating process by the focus command position calculator 104 in embodiment 3. Step S201 to step S203 are processes similar to step S101 to step S103 in embodiment 1. If the read mode is the distance specifying mode, then in step S204, the focus command position calculator 104 checks whether this is the first time to switch to the distance specifying mode. The focus command position calculator 104 proceeds to step S205 if the process is performed for the first time, while the focus command position calculator 104 proceeds to step S208 if the process is performed not for the first time. FIGS. 9A and 9B are explanatory diagrams of the method of calculating the focus command value in steps S205 to S207. The ChangePoint represents the position of the knob 101 at a point when the mode is switched. In step S205, the focus command position calculator 104 calculates a command value (F_Posi.S) at the position at which the mode is switched, from the equation (2) in embodiment 1. In step S206, the focus command position calculator 104 reads the position range set value from the focus position storing unit 107. In step S207, the focus command position calculator 104 calculates a converting equation for calculating the focus command value by using the value read in step S206.

When the position range 1065 (F_Posi.A) is a positive value, the focus command position calculator 104 prepares the following equation for calculating the focus command position Y from the operated rotation angle X, based on the two points (ChangePoint, F_Posi.S) and (360, F_Posi.S+F_Posi.A) in FIG. 9A.

$$Y=(F\_Posi.A/(360-\text{ChangePoint})) \times X+F\_Posi.S(1-F\_Posi.A/(360-\text{ChangePoint})) \quad (5)$$

When the position range 1065 (F_Posi.A) is a negative value, the focus command position calculator 104 prepares the following equation for calculating the focus command position Y from the operated rotation angle X, based on the two points (F_Posi.S, F_Posi.S) and (0, F_Posi.S+F_Posi.A) in FIG. 9B.

$$Y=(-F\_Posi.A/\text{ChangePoint}) \times X+(F\_Posi.S+F\_Posi.A) \quad (6)$$

In step S208, the focus command position calculator 104 calculates the focus command position Y from the position X of the operating unit based on the equation obtained in step S207. In this way, the sensitivity to change in the focus position relative to the knob operation angle can be changed from a mode change position, which makes fine adjustment possible.

If the mode is not the distance specifying mode in step S203, the focus command position calculator 104 proceeds to step S209, in which it calculates the focus command position Y by using the equation (2).

In step S210, the focus command position calculator 104 sends the focus command position Y, calculated in either of the modes, to the lens 20 through the communicating unit 105.

As described above, in embodiment 3, operation across a set distance range can be performed using the entire range of the knob 101 of the focus controller 10, as in embodiments 1 and 2. This allows easy fine adjustment of the focus. In addition, the characteristic is switched based on a point at which the mode is switched to the distance specifying mode. Hence, it is possible to use and switch between the two modes seamlessly.

Embodiment 4

Next, a fourth embodiment of the present invention will be described.

Figure 10:
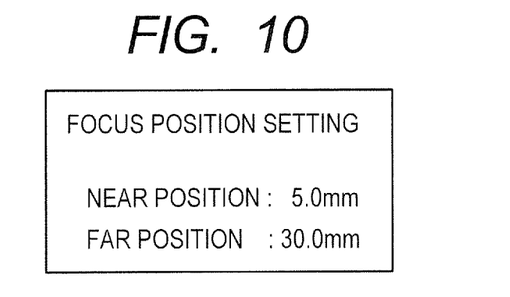
FIG. 10 illustrates a user interface (embodiment 4).

FIG. 10 is an example of the user interface of the focus position setting unit 106 in embodiment 4. In this embodiment, the focus distance can be displayed and set in real distance (~m).

Figure 11:
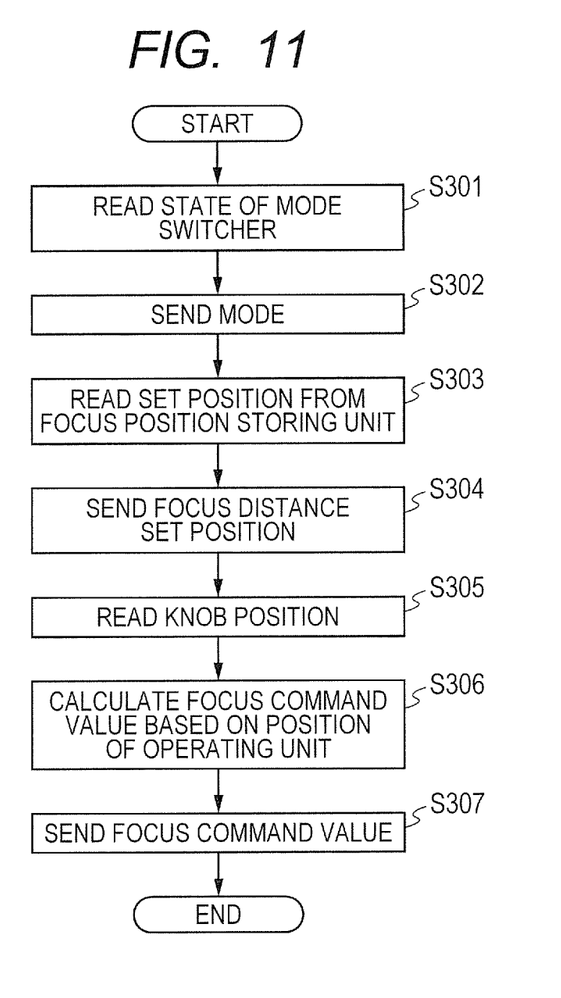
FIG. 11 is a flowchart of a process by a focus command position calculator in embodiment 4.

FIG. 11 is a flowchart of a process by the focus command position calculator 104 in embodiment 4. The focus command position calculator 104 reads the state of the mode switching unit 103 in step S301 and sends the read state to the lens 20 in step S302. The focus command position calculator 104 reads the two focus distance set positions from the focus position storing unit 107 in step S303 and sends them to the lens 20 in step S304. Then, the focus command position calculator 104 reads the position of the knob 101 in step S305, calculates the focus command position Y from the equation (2) in step S306, and sends it to the lens 20 in step S307.

Figure 12:
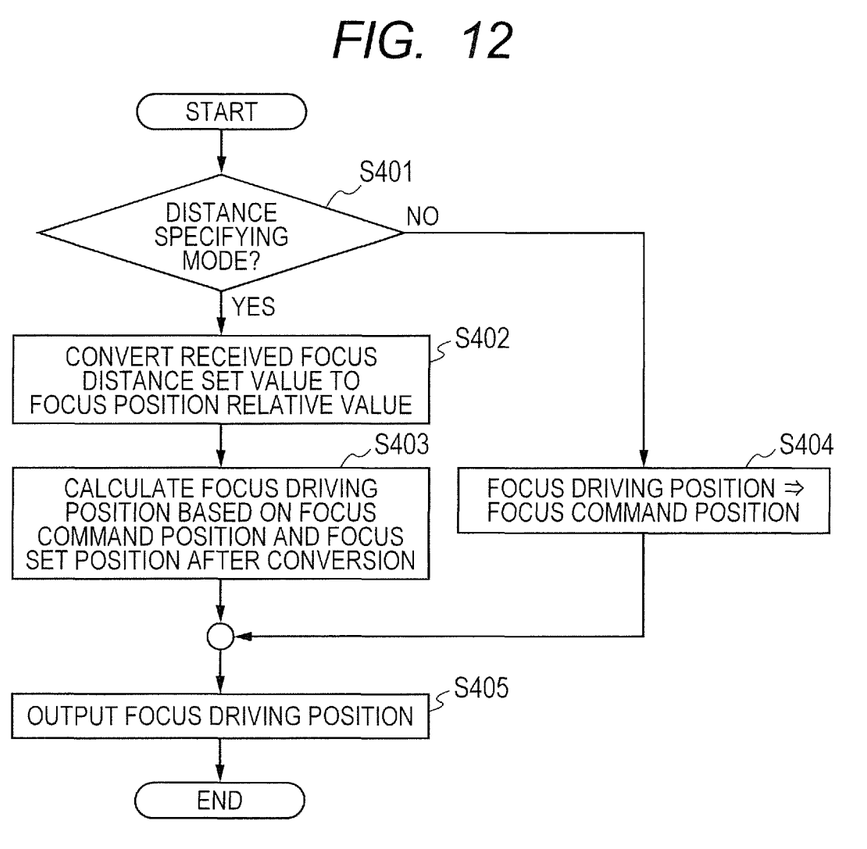
FIG. 12 is a flowchart of a process by a focus drive position calculator in embodiment 4.
Figure 13:
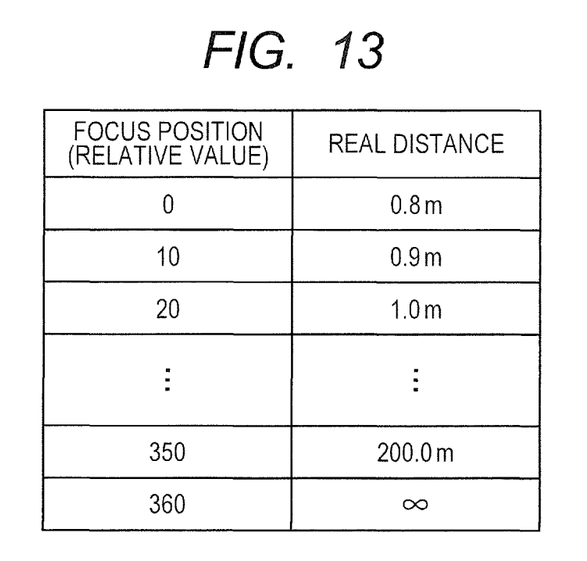
FIG. 13 illustrates a focus distance conversion table.

FIG. 12 is a flowchart of a process by the focus drive position calculator 202. Assume that the mode state, the focus distance set positions, and the focus command position have been received from the focus controller 10 through the flowchart of FIG. 11. In step S401, the focus drive position calculator 202 checks the received mode state. The focus drive position calculator 202 proceeds to step S402 if the mode is the distance specifying mode, while the focus drive position calculator 202 proceeds to step S404 if the mode is the standard mode. In step S402, the focus drive position calculator 202 converts the received focus distance set values. FIG. 13 is a focus distance conversion table stored in the focus drive position calculator 202. The focus set values in this embodiment are real distance values. Thus, using the conversion table, the focus drive position calculator 202 converts them into relative position values standardized with the focus drive range. Of the two values thus converted, the near side value is set as F_Posi.A while the far side value is set as F_Posi.B. Then, the focus drive position calculator 202 proceeds to step S403, in which it calculates a focus drive command position. With the focus drive command position as Y and the focus command position received from the lens 20 as X, the focus drive position calculator 202 calculates Y from the equation (1), which has been described in embodiment 1. In step S404, the focus drive position calculator 202 sets the focus drive command position Y to a value equal to the focus command position X. In step S405, the focus drive position calculator 202 outputs the focus drive position, calculated in step S403 or step S404, to the focus controller 203 to drive the focus lens 204 accordingly.

As described above, operation across a set distance range can be performed using the entire range of the knob 101 of the focus controller 10, as in embodiments 1 to 3. This allows easy fine adjustment of the focus. In addition, in embodiment 4, the focus distance range can be specified in real distance. This eliminates the need for re-setting the focus range even after changing the combination of the focus controller 10 and the lens 20.

Embodiment 5

Next, a fifth embodiment of the present invention will be described. In embodiments 1 to 3, the focus command position calculator 104 of the focus controller 10 performs the conversion of the position of the knob 101 into a focus command position. However, the lens 20 may instead perform this process.

Figure 14:
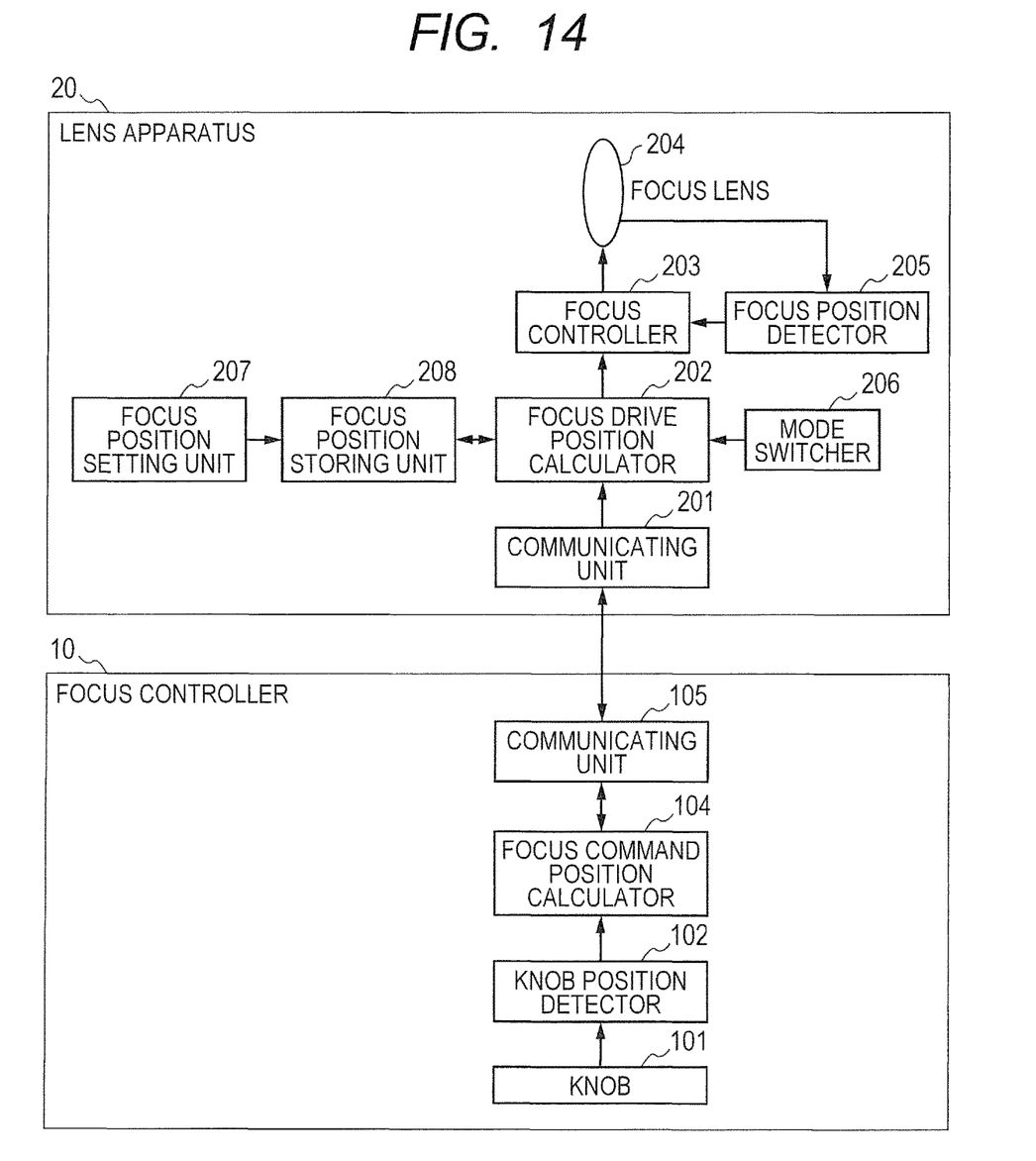
FIG. 14 is a system block diagram of a focus controller in embodiment 5.

FIG. 14 is a block diagram of the circuit configuration of a focus controller in embodiment 5. The lens 20 includes a mode switching unit 206, a focus position setting unit (position setter) 207, and a focus position storing unit 208.

The focus command position calculator 104 calculates a focus command position proportional to the amount of operation of the knob 101 by using the equation (2), and sends it to the lens 20 through the communicating unit 105. The focus drive position calculator 202 determines the focus drive position by executing a process similar to those by the focus command position calculator 104 of the focus controller 10 in embodiments 1 to 3.

As described above, even if a conventional controller is used as the focus controller 10, similar advantageous effects can be achieved by having on the lens execute focus drive position calculation similar to those in embodiment 1 to 3.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-227542, filed Nov. 24, 2016, which is hereby incorporated by reference herein in its entirety.

What is claimed is:

1. A control apparatus comprising:
an operating member having a limited movable range and configured to operate a movable optical member;
a setting device configured to set a relation between an operation amount of the operating member and a command value for the movable optical member;
a controller configured to obtain the command value based on the set relation and the operation amount; and
a switching device configured to switch modes between a first mode and a second mode, the first mode causing an entirety of the limited movable range of the operating member to correspond to an entirety of an operating range of the movable optical member, the second mode causing the entirety of the limited movable range of the operating member to correspond to a part of the operating range of the movable optical member,
wherein the setting device is configured to set the relation such that the command value is unchanged for a predetermined operation amount in the limited movable range in any of the first mode and the second mode.

2. The control apparatus according to claim 1, wherein the setting device is configured to set the relation based on a range of the command value corresponding to one side with respect to the predetermined operation amount in the limited movable range.

3. The control apparatus according to claim 1, wherein the predetermined operation amount has been determined as an operation amount of the operating member at a time when the switching device switches modes from the first mode to the second mode.

4. The control apparatus according to claim 1, wherein the setting device includes a user interface for setting of the predetermined operation amount.

5. The control apparatus according to claim 2, wherein the setting device includes a user interface for inputting the range of the command value corresponding to the one side.

6. The control apparatus according to claim 4, wherein the user interface also is for inputting a range of the command value corresponding to one side.

7. The control apparatus according to claim 1, wherein the movable optical member is a focus lens.

8. The control apparatus according to claim 5, wherein the movable optical member is a focus lens, and the user interface is configured to perform input in a form of distance.

9. A lens apparatus comprising:
a movable optical member; and
a control apparatus, the control apparatus comprising:
an operating member having a limited movable range and configured to operate the movable optical member;
a setting device configured to set a relation between an operation amount of the operating member and a command value for the movable optical member;
a controller configured to obtain the command value based on the set relation and the operation amount; and
a switching device configured to switch modes between a first mode and a second mode, the first mode causing an entirety of the limited movable range of the operating member to correspond to an entirety of an operating range of the movable optical member, the second mode causing the entirety of the limited movable range of the operating member to correspond to a part of the operating range of the movable optical member, wherein the setting device is configured to set the relation such that the command value is unchanged for a predetermined operation amount in the limited movable range in any of the first mode and the second mode.

10. An operating apparatus comprising a control apparatus, the control apparatus comprising:

an operating member having a limited movable range and configured to operate a movable optical member included in a lens apparatus;

a setting device configured to set a relation between an operation amount of the operating member and a command value for the movable optical member;

a controller configured to obtain the command value based on the set relation and the operation amount; and a switching device configured to switch modes between a first mode and a second mode, the first mode causing an entirety of the limited movable range of the operating member to correspond to an entirety of an operating range of the movable optical member, the second mode causing the entirety of the limited movable range of the operating member to correspond to a part of the operating range of the movable optical member, wherein the setting device is configured to set the relation such that the command value is unchanged for a predetermined operation amount in the limited movable range in any of the first mode and the second mode.

* * * * *